United States Patent [19]

Ruhnau

[11] 4,101,789
[45] Jul. 18, 1978

[54] SIGNAL MULTIPLIER CIRCUIT FOR A VEHICLE ANTI-SKID WHEEL SENSOR

[75] Inventor: Gerhard Ruhnau, Hanover, Fed. Rep. of Germany

[73] Assignee: WABCO Westinghouse GmbH, Hanover, Fed. Rep. of Germany

[21] Appl. No.: 714,294

[22] Filed: Aug. 16, 1976

[30] Foreign Application Priority Data

Nov. 7, 1975 [DE] Fed. Rep. of Germany ....... 2549953

[51] Int. Cl.$^2$ ...................... H03K 21/00; H03K 5/00; B60T 8/00
[52] U.S. Cl. ............................ 307/220 R; 307/233 B; 307/225 R; 307/261; 303/91; 328/20; 328/38
[58] Field of Search ........... 307/220 R, 225 R, 233 A, 307/233 B, 216, 261; 328/20, 28, 38; 303/91

[56] References Cited

U.S. PATENT DOCUMENTS

| | | | |
|---|---|---|---|
| 3,764,927 | 10/1973 | Allinger et al. | 328/20 |
| 3,770,327 | 11/1973 | Ruof | 307/261 |
| 3,803,425 | 4/1974 | Carp | 307/233 B |
| 3,808,543 | 4/1974 | Mueller | 328/38 |
| 3,909,717 | 9/1975 | Gazzano | 328/38 |
| 3,926,478 | 12/1975 | Ruof | 328/38 |

*Primary Examiner*—Stanley D. Miller, Jr.
*Attorney, Agent, or Firm*—R. W. McIntire, Jr.

[57] ABSTRACT

A signal multiplier circuit in which a sinusoidal input signal corresponding to the angular velocity of a rotating member, such as a vehicle wheel, is connected directly to one input of each comparator of a positive and a negative polarity responsive network. The sinusoidal input signal is concurrently connected to the other input of each comparator via a signal modifying circuit whose output deviates from the sinusoidal input signal, consequently effecting operation of the respective comparators a predetermined number of degrees beyond the positive and negative transitions of the sinusoidal input signal. Each comparator output is thus phase displaced relative to the other and is connected via logic circuits which provide a signal whose polarity alternations are a multiple of the sinusoidal input signal generated to thereby provide a more accurate response of wheel anti-skid signal sensing circuitry at low vehicle speeds.

10 Claims, 7 Drawing Figures

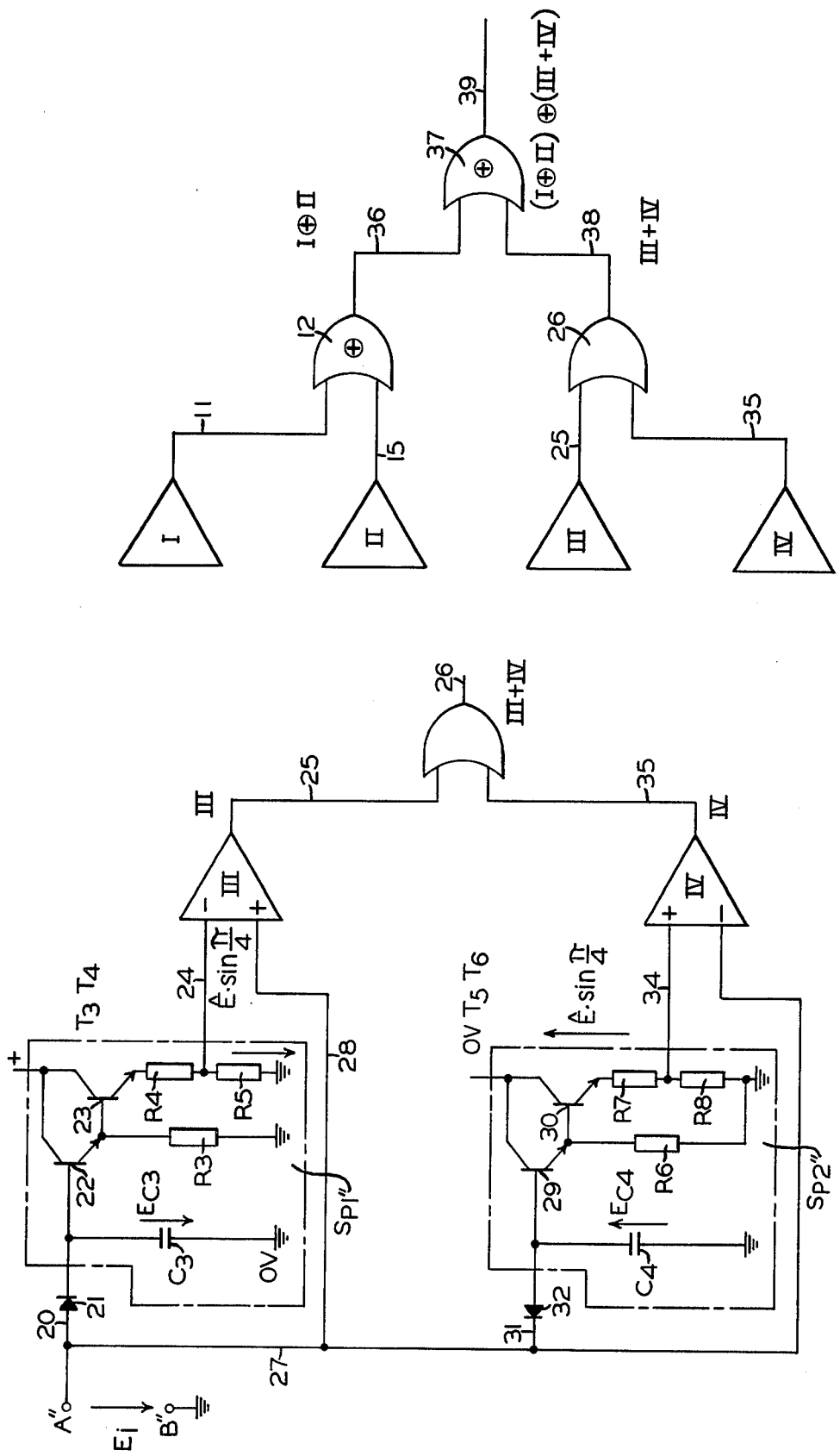

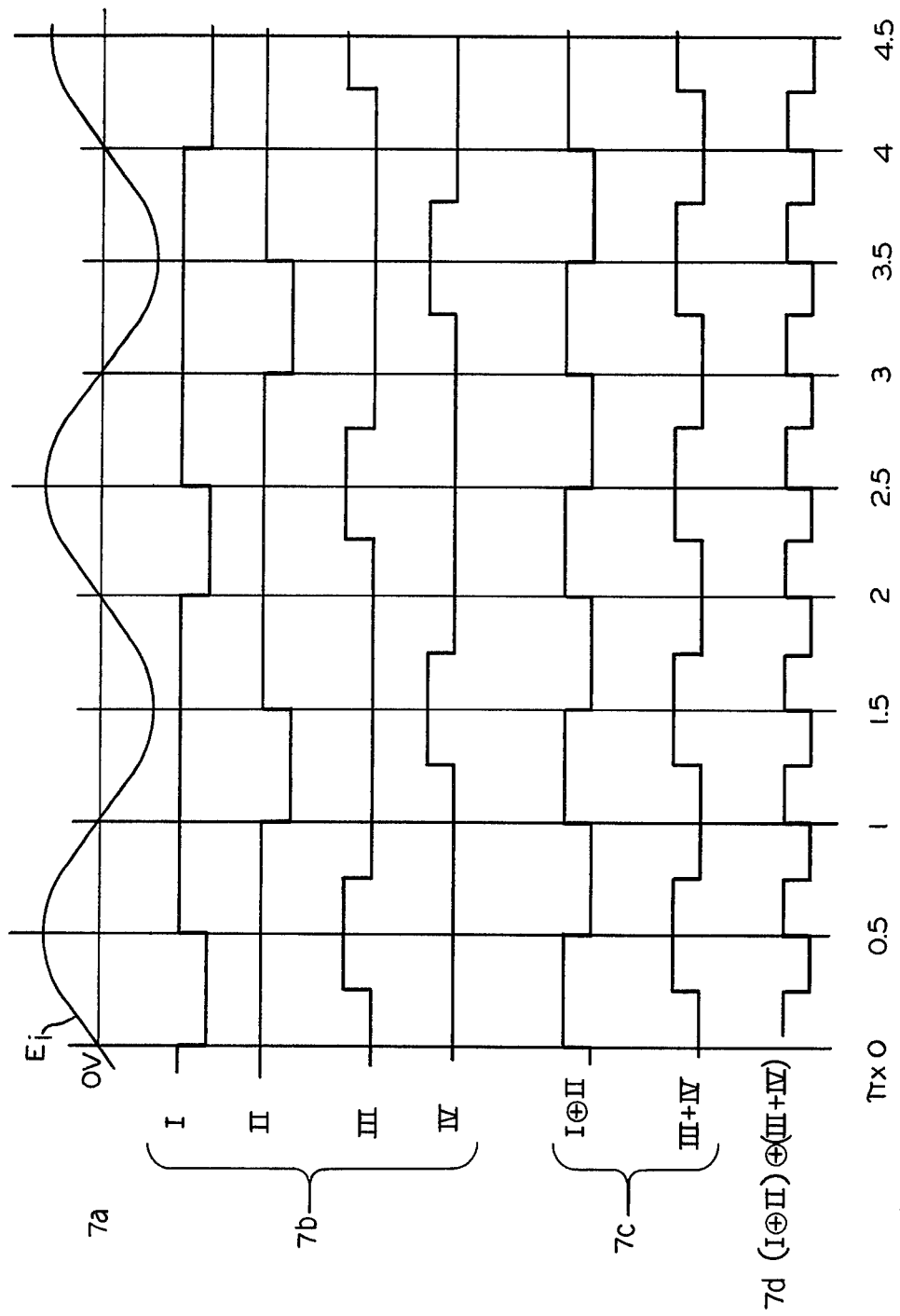

SIGNAL MULTIPLIER CIRCUIT FOR A VEHICLE ANTI-SKID WHEEL SENSOR

BACKGROUND OF THE INVENTION

The present invention relates to a vehicle antiskid brake control system and particularly an antiskid system including a sensor device for yielding pulses at a frequency proportional to the rotational speed of a vehicle wheel and a logic circuit for producing digital output signals as a function of a voltage that is proportional to the sensor output frequency.

The effectiveness of vehicle antiskid brake control systems is predicated in large measure to the ability of the system to operate with good response, particularly at low vehicle speeds.

Known circuits employed in antiskid brake control systems are only capable of providing a maximum of four information units within a given period of the sinusoidal wave of the sensor device.

SUMMARY OF THE INVENTION

The object of this invention therefore is to provide a circuit capable of producing any quantity of output signals (units of information) within a given period of the sinusoidal output wave produced by a sensor device associated with a typical antiskid brake control system in order to obtain good response, even at low vehicle speeds.

The above objective is accomplished by connecting to one input of a first comparator device the output voltage of a storage circuit to which the sinusoidal sensor waveform is connected. The comparator provides an output signal when a difference arises between the output of the storage circuit and the sinusoidal waveform, which is connected directly to the other input of the comparator. At least one logic circuit is subject to the first comparator output signal and to the output signal of a second comparator arranged similar to the first comparator for operation during the negative excursion of the sinusoidal waveform.

BRIEF DESCRIPTION OF THE DRAWINGS

In the drawings to which the following more detailed explanation refers:

FIG. 5 shows another circuit for producing an output waveform consisting of four additional output signals within a given cycle of the sinusoidal waveform;

FIG. 6 shows the circuits of FIG. 2 and FIG. 5 combined to form a waveform consisting of eight output signals; and FIG. 7 shows a graph representing a sinusoidal waveform and the various signals generated by the circuits of FIGS. 2 and 5 and the combination of these circuits according to FIG. 6.

DESCRIPTION AND OPERATION

Figure 1:
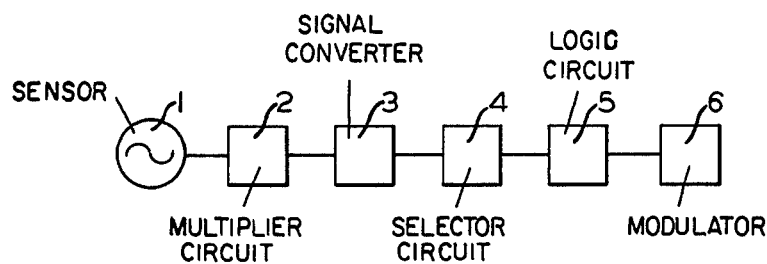
FIG. 1 shows a block diagram of an antiskid brake control system including a circuit arranged in accordance with the present invention.

In FIG. 1 is shown a sensor 1, which delivers a sine voltage corresponding to the angular velocity of a vehicle wheel. The sine voltage transmitted by sensor 1 is fed to a circuit arrangement 2 comprising the present invention, which provides a unit of information about the rotational behavior of the wheel. Per each cycle of the sinusoidal output voltage of the sensor, the circuit arrangement 2 produces four or more output signals that are fed to a frequency-voltage converter 3, which converts the frequency-discriminating voltage into a proportional voltage. The output voltage supplied by frequency-voltage converter 3 is fed to an electronic selector circuit 4, which checks this voltage against predetermined values. If the output voltage of the frequency-voltage converter 3 exceeds or remains below the predetermined values, the selector circuit 4 sends appropriate control signals to a logic circuit 5. The logic circuit 5 is operative responsive to these control signals to actuate solenoid inlet and/or outlet valves of a modulator valve unit 6, which controls the wheel brake pressure independently of the vehicle operator.

Figure 2:
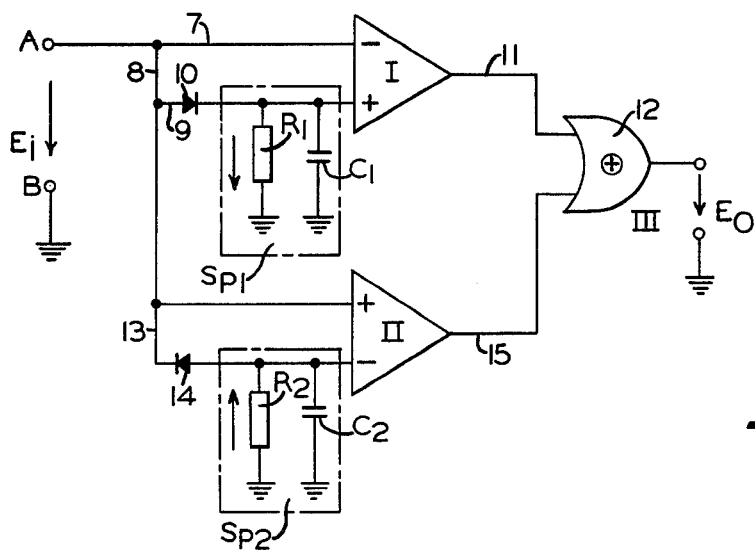
FIG. 2 shows a circuit arranged according to the invention for producing an output waveform consisting of four output signals within a given cycle of a sinusoidal waveform generated by a wheel sensor.

In FIG. 2 is shown the circuit arrangement according to the invention for producing four output signals within one cycle of the sinusoidal output voltage of sensor 1. Points A and B of circuit arrangement 2 are connected to sensor 1, point B being grounded. The inverting input of a comparator I is connected with the output of sensor 1 via point A and a line 7. The non-inverting input of comparator I is connected with point A by way of a line 9 and a branch line 8 of line 7. A diode 10 is inserted in line 9 in such a manner that only the positive voltage of sensor 1 can reach the non-inverting input of comparator I. A capacitor $C_1$ and a discharge resistor $R_1$, which form a storage circuit $S_{p1}$, are grounded via line 9. A line 11 connects the output of comparator I to an input of an exclusive OR circuit 12. Branchline 8 is connected to the non-inverting input of a second comparator II. The inverting input of the comparator II is connected with point A by way of line 13 and branchline 8. A capacitor $C_2$ and a discharge resistor $R_2$ are grounded via the line 13 and form an additional storage circuit $S_{p2}$. A diode 14 is inserted in line 13 in such a manner that only negative voltages coming from sensor 1 reach the inverting input of the comparator II. A line 15 connects the output of the comparator II to the second input of exclusive OR circuit 12.

The function of the above-described circuit arrangement is explained below with reference to FIGS. 1, 2 and 4.

Sensor 1 supplies a voltage $\hat{E}_i \sin \varphi$ to point A of the circuit 2 having a frequency corresponding to the angular velocity of a wheel. During the time interval of 0 – 0.5 $\pi$ the voltage $E_i$ (input voltage) rises sinusoidally at the inverting input of comparator I (FIG. 4). Via lines 7, 8, 9 and diode 10, the positive voltage reduced by the diode forward voltage $E_D$ is concurrently fed to the capacitor $C_1$ of storage circuit $S_{p1}$, thus charging the capacitor ($E_i - E_D = E_{C1}$). This voltage $E_{C1}$ is connected to the non-inverting input of comparator I. Since the voltage at the inverting input of comparator I is greater than that at the non-inverting input, by the amount of the voltage drop $E_D$, the output voltage of comparator I is "low" during the time interval of 0 – 0.5 $\pi$. Comparator I supplies this output signal to the first input of the exclusive OR circuit 12 via line 11, as indicated in graph 4C, I of FIG. 4. At the moment 0.5 $\pi$ the capacitor $C_1$ begins to discharge via the discharge resistor $R_1$. At 0.5 $\pi$ in time, the sine voltage $E_i$ at the inverting input of the comparator I has reached its peak value, and drops to 0 V during the time interval of 0.5 $\pi-\pi$ and then becomes negative. The voltage of capacitor $C_1$ drops in accordance with a predetermined discharge rate. As soon as the voltage $E_i$ is smaller than the capacitor voltage $E_{C1}$, the comparator I supplies a "high" output signal to the exclusive OR circuit 12 via line 11.

The discharge resistor $R_1$ is so adapted that the capacitor voltage $E_{C1}$ drops to 0 V at time 2 $\pi$.

The voltage drops at the non-inverting input of comparator II during the period of $\pi-1.5\ \pi$. At the same time the negative voltage reduced by the diode forward voltage $E_D$ of diode 14 is fed to capacitor $C_2$ of storage circuit $S_{p2}$, thus charging it ($E_i - E_D = E_{C2}$). During the time interval $\pi-1.5\ \pi$ the voltage at the non-inverting input of comparator II is therefore more negative than the voltage at the inverting input of the comparator II. The output voltage of the comparator is "low". This signal is applied to the second input of the exclusive OR circuit 12 via line 15, as indicated in graph 4C, II of FIG. 4. At moment 1.5 $\pi$, the negative voltage has reached its peak value and rises again. The voltage of capacitor $C_2$ rises more gradually, however. As soon as the voltage $E_i$ exceeds the capacitor voltage $E_{C2}$, comparator II supplies a "high" output signal to the second input of the exclusive OR circuit 12 by way of line 15. The discharge resistor R2 of storage circuit $S_{p2}$ is so adapted that at moment 3 $\pi$, the capacitor voltage $E_{C2}$ has risen to 0 V. The exclusive OR circuit 12 supplies a "high" output signal $E_o$ whenever there are different voltages at its two inputs, as represented by the graph 4C, III of FIG. 4.

If the sensor of an antiskid device has an output voltage whose frequency varies over a wide range, it is necessary that the capacitors of the storage circuits can be discharged very quickly.

Figure 3:
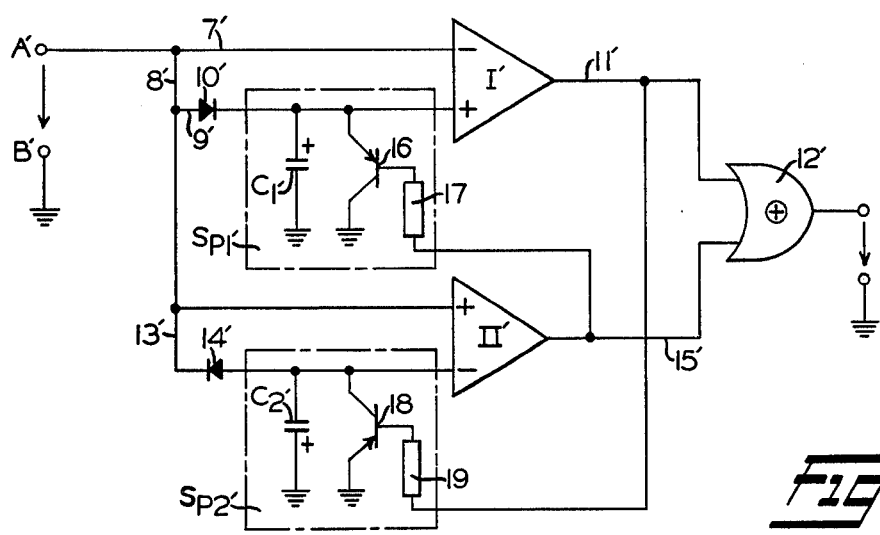
FIG. 3 shows a circuit as in FIG. 2, wherein the storage circuit comprises a switching transistor instead of a discharge resistor.

FIG. 3 shows a circuit arrangement which is essentially the same as the circuit arrangement of FIG. 2, but which, for the purpose of rapidly discharging the capacitors, has switching transistors instead of discharge resistors. For more clarity the lines and elements of this circuit have, with the exception of the switching transistors and associated resistors, been provided with the same reference numbers and signs as those in FIG. 2, but with prime marks added.

The points A' and B' of this circuit arrangement are connected to a sensor, not shown, point B' being grounded. The inverting input of a comparator I' is connected with point A' at the output of the sensor by way of a line 7'. The non-inverting input of the comparator I' is connected with point A' at the output of the sensor by way of a line 7'. The non-inverting input of the comparator I' is connected with point A' by way of a branchline 8' of line 7', and a line 9'. A diode 10' is inserted in the line 9' in such a manner that only the positive voltage of the sensor can reach the non-inverting input of comparator I'. A capacitor $C_1'$ and a switching transistor 16, which form a storage circuit $S_{p1}'$, are grounded by way of line 9'. The base of the switching transistor 16 is connected with the output of a second comparator II' by way of a resistor 17. A line 11' connects the output of comparator I' to a first input of an exclusive OR circuit 12'. Branchline 8' is connected with the non-inverting input of the second comparator II'. The inverting input of comparator II' is connected with point A' by way of a line 13' connected to the line 8'. A diode 14' is inserted in line 13' in such a manner that only negative voltages from the sensor reach the inverting input of the comparator II'. A capacitor $C_2'$ and a switching transistor 18 are grounded by way of line 13' and form an additional storage circuit $S_{p2}'$. The base of switching transistor 18 is connected with the output of comparator I' by way of a resistor 19. A line 15' connects the output of the comparator II' to the second input of the exclusive OR circuit 12'.

The function of this circuit arrangement requires no further explanation since the only difference from the circuit of FIG. 2 already described above is that in the event of a "low" output signal at comparator II', the switching transistor 16 of storage circuit $S_{p1}'$ is connected through, so that the capacitor $C_1'$ is discharged, and in the event of a "low" output signal at the comparator I' the switching transistor 18 of the storage circuit $S_{p2}'$ is connected through, which results in a discharge of the capacitor $C_2'$.

Figure 4:
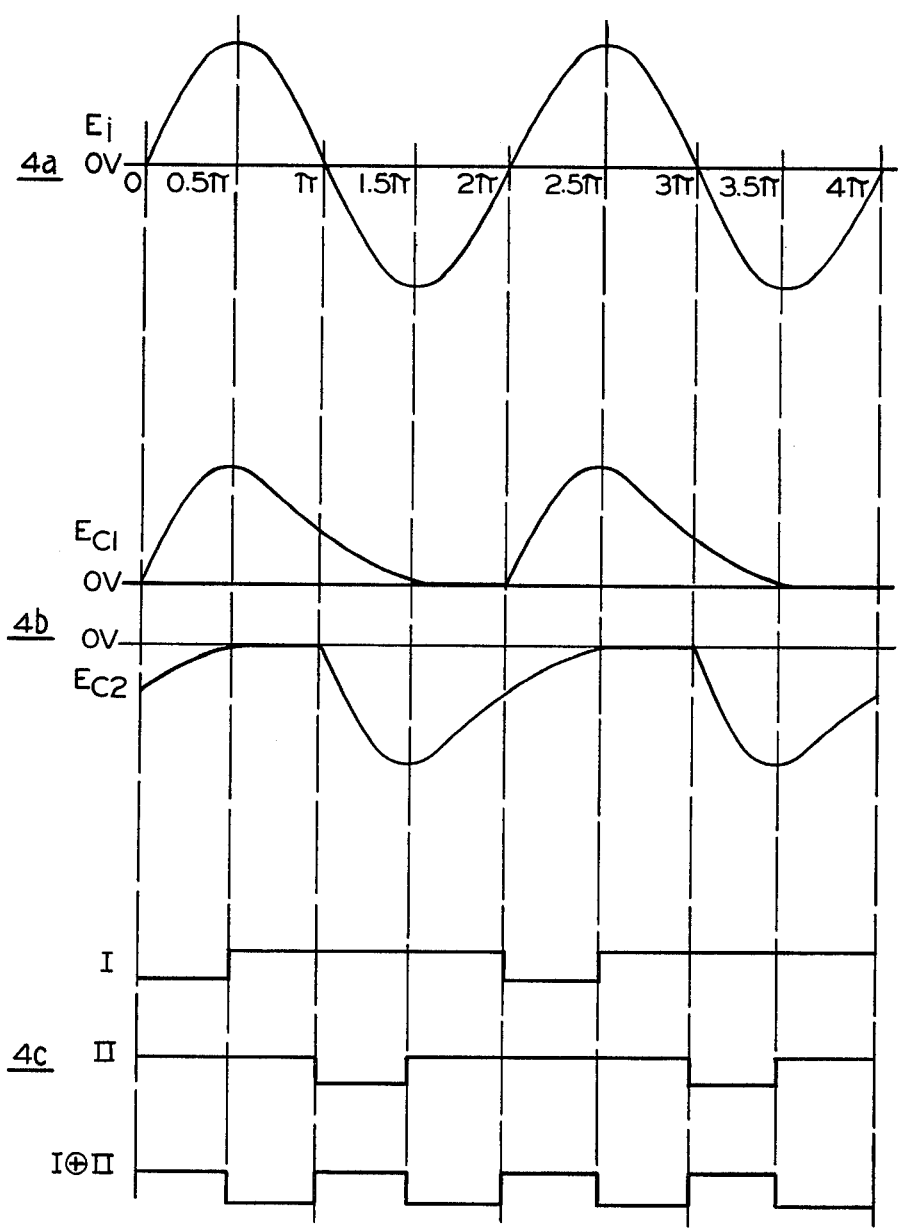
FIG. 4 shows a graph representing a sinusoidal waveform and various signals generated by the circuit of FIG. 2 in producing the final output waveform.

The graphs shown in FIG. 4 represent variations of the sinusoidal output voltage of the sensor, the capacitor voltages, and the occurrence of output signals at the outputs of comparators I and II, as well as the output voltage $E_o$ formed by the exclusive OR circuit, in accordance with the output signals of comparators I and II.

As apparent from graph 4a, sensor voltage $E_i$ (input voltage at point A of the circuit arrangement of FIG. 2) rises to its peak value (maximum) during the time interval of 0–0.5 $\pi$. At the same time the voltage $E_{C1}$ reduced by the forward voltage of diode 10 is fed to capacitor $C_1$, thus charging it, as seen in graph 4b. A "low" output signal, as shown in graph 4c, I of FIG. 4, occurs at the output of comparator I, since the voltage is greater at the inverting input of comparator I than at the non-inverting input.

At time 0.5 $\pi$, capacitor $C_1$ begins to discharge via discharge resistor $R_1$. At the same time the voltage $E_i$ at the non-inverting input of comparator I drops to 0 V at time $\pi$ and then becomes negative. Since the capacitor voltage, as determined by the discharge rate of resistor $R_1$, drops slower than voltage $E_i$, the voltage is smaller at the inverting input of comparator I at time II than at the non-inverting input, and a "high" output signal consequently occurs at the output of comparator I. At time $\pi$, voltage $E_i$ changes from a positive to a negative voltage. During the time interval $\pi-1.5\ \pi$, the voltage at the non-inverting input of the comparator II drops to its peak value (minimum) as seen in graph 4a. At the same time, the negative voltage reduced by the forward voltage $E_D$ of diode 14 is fed to capacitor $C_2$ thus charging it as in the graph 4b. During the time interval II–1.5 $\pi$ the voltage at the non-inverting input of the comparator II is therefore more negative than the voltage at the inverting input. The output voltage of comparator II is "low", as in graph 4c, II. At time 1.5 $\pi$, the negative voltage has reached its peak value and rises again. Since the voltage of capacitor $C_2$ rises more gradually, voltage $E_i$ exceeds the capacitor voltage $E_{C2}$ and comparator II accordingly delivers a "high" output signal, as shown in graph 4c, II of FIG. 4.

The signals supplied by comparators I and II are applied to the exclusive OR circuit 12 which produces an output signal whenever the voltages at its two inputs are at different logic levels. When the output signal of comparator I is "low" and the output signal of comparator II is "high", the exclusive OR circuit delivers a "high" output signal, as shown in graph 4c, III of FIG.

4. When the output signals of both comparators are "high", a "low" signal appears at the output of the exclusive OR circuit. Should the output signal of the comparator II be "low" and that of the comparator I be "high", then the exclusive OR circuit again supplies a "high" output signal.

Another advantageous form of the invention is shown in FIG. 5. In order to obtain four additional signals, the output of the sensor is connected with two transistors 22 and 23, which form an impedance coupling, by way of point A'', a line 20 and a diode 21 blocking in the direction of point A''. A capacitor $C_3$ is grounded by way of line 20. The emitter terminal of transistor 22 is connected to a grounded resistor $R_3$. A voltage divider consisting of the resistors $R_4$ and $R_5$ is grounded by way of the emitter of transistor 23. The center tap 24 of the voltage divider is connected to the inverting input of a comparator III. A line 25 connects the output of comparator III to a first input of an OR gate 26. A branchline 27 of line 20 is directly connected to the inverting input of a second comparator IV. A line 28 forms the connection between the non-inverting input of comparator III and point A'' via line 27. Two transistors 29 and 30 are interconnected to form an impedance coupling with point A'' by way of lines 31, 27 and 20. A diode 32 blocking in the direction of the transistors 29, 30 is inserted in line 31. A capacitor $C_4$, connected to line 31 between diode 32 and transistor 29, is grounded. The emitter terminal of transistor 29 is connected with one side of a voltage divider, consisting of the resistors $R_7$ and $R_8$, by way of a resistor $R_6$. The other side of the voltage divider is directly connected to the emitter of transistor 30. The center tap 34 of the voltage divider is connected to the non-inverting input of comparator IV. A line 35 connects the output of comparator IV to the second input of OR gate 26.

It is to be understood that in this circuit arrangement, diode 21 limits operation of comparator III to positive going voltages, while diode 32 limits operation of comparator IV to negative going voltages.

The maximum sensor voltage less the voltage drop across diode 21 is stored in capacitor $C_3$ as voltage $E_{C3} = \hat{E}_i - E_D$ (capacitor voltage = input voltage − diode forward voltage). Transistors 22 and 23 provide capacitor $C_3$ only with a very high-resistance load. The voltage at the output of the impedance coupling transistor pair is divided down to an adjustable factor by means of the voltage divider consisting of resistors $R_4$ and $R_5$. In this exemplified embodiment, the voltage at the inverting input of comparator III is set at $\hat{E} \cdot \sin(\pi/4)$ (70.72 of the maximum voltage). If the voltage $E_i = \hat{E}_i \sin \varphi$ exceeds the stored $\hat{E} \cdot \sin(\pi/4)$, the output of comparator III has a "high" potential.

The circuitry associated with comparator IV functions similarly. Only in this case the minimum is stored, while the comparator IV delivers a signal when the input voltage is smaller than $-\hat{E} \cdot \sin(\pi/4)$. Thus, when $-\hat{E}_i \cdot \sin(\pi/4)$ is greater than $-E_i = \hat{E}_i \cdot \sin \varphi$, the output voltage of comparator IV is "high" and when $-\hat{E}_i \cdot \sin(\pi/4)$ is smaller than $-E_i = \hat{E}_i \cdot \sin \varphi$, the output voltage of comparator IV is "low".

The outputs of comparators III and IV are brought together by the OR gate 26, which supplies the signals III + IV in graph 7c of FIG. 7.

FIG. 6 shows the effect of combining the circuit arrangement of FIGS. 2 and 5. This makes it possible to obtain eight output signals, i.e., eight units of information about the rotational behavior of a sensed wheel during one cycle of the sinusoidal output voltage of the sensor.

For the sake of more clarity only the comparators I, II and III, IV of the circuit arrangements according to the FIGS. 2 and 5 are shown.

The lines 11 and 15 connect comparators I and II to the exclusive OR circuit 12 (taken from the circuit arrangement of FIG. 2). The OR gate 26 (according to the circuit arrangement of FIG. 5) is connected to the outputs of comparators III and IV via lines 25 and 35. A line 36 connects the exclusive OR circuit 12 to a first input of an exclusive OR circuit 37. The output of the OR gate 26 is connected to the second input of the exclusive OR circuit 37 via a line 38. The exclusive OR circuit 37 delivers, via a line 39, an output signal to the frequency-voltage converter (not shown) whenever there are different input voltages present at the inputs of exclusive OR circuit 37.

The graphs in FIG. 7 show:

a. the sensor sinusoidal output voltage which is at point A of the circuit arrangements according to the FIGS. 2 and 5 and which corresponds to the angular velocity of a wheel,
b. I the output voltage of the comparator I,
b. II the output voltage of the comparator II,
b. III the output voltage of the comparator III,
b. IV the output voltage of the comparator IV,
c. I⊕II the voltage supplied by the exclusive OR circuit 12 (according to FIG. 2),
c. III⊕IV the voltage supplied by the OR gate 26 (according to FIG. 5),
d. (I⊕II) ⊕(III + IV) the output voltage supplied by the exclusive OR circuit 37 to the frequency-voltage converter, Since each of the comparators I, II, III and IV supplies two output signals ("high" and "low") within one cycle of the sinusoidal output voltage of the sensor, there occurs an output signal at the output of the exclusive OR circuit 37 at intervals of $\frac{1}{4}\pi$.

Having now described the invention, what I claim as new and desire to secure by Letters Patent, is:

1. A frequency multiplier circuit having an output signal whose alternation frequency is a multiple of the frequency of the sinusoidal input signal generated in accordance with the angular velocity of a rotating member, comprising:
  (a) an input terminal to which said sinusoidal input signal is connected;
  (b) first and second comparators each having an output and a pair of inputs, one input of the first comparator and a different input of the second comparator being connected to said input terminal;
  (c) first and second signal modifying circuit means connected to the other inputs of the respective comparators for providing a first and second modifying signal thereat with which said sinusoidal input signal is compared, each said first and second circuit means comprising:
    (i) a capacitor connected between said input terminal and ground so as to be charged by said sinusoidal input signal; and
    (ii) a resistor via which said capacitor of the same one of said circuit means is discharged in accordance with a certain chosen r-c time constant;
  (d) first and second diodes, each disposed between said input terminal and the capacitor of a respective one of said first and second circuit means, whereby said one capacitor is charged to the peak value of the sinusoidal input signal during positive half-cycles and the other capacitor is charged to the peak value of the sinusoidal input signal during negative half-cycles thereof;

(e) said first and second comparators providing first and second difference signals at the respective outputs thereof in the absence of correspondence between the sinusoidal input signal and the modifying signal, said first and second difference signals having a 180° phase displacement therebetween; and (f) logic means connected to the output of said first and second comparators for combining said first and second difference signals so as to provide a first multiple frequency output signal.

2. A frequency multiplier circuit, as recited in claim 1, further characterized in that said certain chosen r-c time constant is such that said modified signal of each said circuit means deviates from said sinusoidal input signal for a duration of 270° thereof.

3. A frequency multiplier circuit, as recited in claim 2, wherein said logic means comprises a first EXCLUSIVE OR gate circuit to which said difference signal of each said comparator is connected, said first EXCLUSIVE OR gate circuit having an output whose polarity alternation frequency is double the frequency of said sinusoidal input signal to provide said first multiple frequency output signal.

4. A frequency multiplier circuit, as recited in claim 3, further comprising:
 (a) third and fourth comparators, each having an output and a pair of inputs, one input of the third comparator and a different input of the fourth comparator being connected to said input terminal;
 (b) third and fourth signal modifying circuit means connected to the other inputs of the respective third and fourth comparators for providing a third and fourth modifying signal thereat with which said sinusoidal input signal is compared, each said third and fourth circuit means comprising:
  (i) a capacitor connected between said input terminal and ground so as to be charged by said sinusoidal input signal;
  (ii) a resistor via which said capacitor of the same one of said circuit means is discharged in accordance with a certain chosen r-c time constant;
  (iii) a voltage divider having a center tap providing the connection of said circuit means with the other input of a respective one of said third and fourth comparators; and
  (iv) a transistor device having a control terminal connected to said capacitor of the same one of said circuit means for switching said transistor on when the voltage potential of said capacitor is above a predetermined level, a first output connected to said resistor of the same one of said circuit means, a second output connected to said voltage divider of the same one of said circuit means and an input to which a source of power is connected, said voltage divider adjusting the power supplied thereto to provide at said center tap said modified signal for the duration said transistor is switched on, said chosen r-c time constant limiting said duration to 90° each cycle of said sinusoidal input signal;

(c) third and fourth diodes, each disposed between said input terminal and the capacitor of a respective one of said third and fourth circuit means, whereby one capacitor of said third and fourth circuit means is charged to the peak value of the sinusoidal input signal during positive half-cycles and the other capacitor of said third and fourth circuit means is charged to the peak value of the sinusoidal input signal during negative half-cycles thereof;

(d) said third and fourth comparators providing third and fourth difference signals at the respective outputs thereof when said sinusoidal input signal exceeds said modifying signal, said third and fourth difference signals having a 180° phase displacement therebetween;

(e) an OR gate to which the third and fourth difference signals are connected to provide a second multiple frequency output signal at double the frequency of the sinusoidal input signal, the output signal at said OR gate being 45° out of phase with said first EXCLUSIVE OR gate output signal; and (f) a second EXCLUSIVE OR gate to which the respective first and second multiple frequency output signals of said OR gate and said first EXCLUSIVE OR gate are connected to provide a third multiple frequency output signal having an alternation frequency quadruple the the alternation frequency of the sinusoidal input signal.

5. A frequency multiplier circuit, as recited in claim 1, each of said first and second modifying circuit means further comprising:
 (a) said capacitor connected to the other input of a respective one of said first and second comparators;
 (b) a transistor having one terminal connected between said capacitor and the other input of the same one of said first and second comparators, and a control terminal, said resistor of said one of said circuit means being connected between said control terminal of said transistor of one said circuit means and the output of said comparator of the other said circuit means, whereby the capacitor discharge path via the resistor of said one of said circuit means is established during the absence of the difference signal at the output of said comparator of the other said circuit means.

6. A frequency multiplier circuit, as recited in claim 5, further characterized in that said certain chosen r-c time constant is such that said modified signal of each said circuit means deviates from said sinusoidal input signal for a duration of 270° thereof.

7. A frequency multiplier circuit, as recited in claim 6, wherein said logic means comprises a first EXCLUSIVE OR gate circuit to which said difference signal of each said comparator is connected, said first EXCLUSIVE OR gate circuit having an output whose polarity alternation frequency is double the frequency of said sinusoidal input signal to provide said first multiple frequency output signal.

8. A frequency multiplier circuit, as recited in claim 1, each of said first and second modifying circuit means further comprising:
 (a) a voltage divider having a center tap providing the connection of said circuit means with the other input of a respective one of said first and second comparators; and
 (b) a transistor device having a control terminal connected to said capacitor of the same one of said circuit means, a first output connected to said resistor of the same one of said circuit means, a second output connected to said voltage divider of the same one of said circuit means and an input to which a source of power is connected, said voltage divider adjusting the power supplied thereto to provide at said center tap said modified signal for the duration said transistor is switched on, said duration being determined by said r-c time constant.

9. A frequency multiplier circuit, as recited in claim 8, further characterized in that said certain chosen r-c time constant is such that said transistor is turned on to provide said modified signal for a duration of 90° of said sinusoidal input signal whereby said modified signal of each said circuit deviates from said sinusoidal input signal for a duration of 90° thereof.

10. A frequency multiplier circuit, as recited in claim 9, wherein said logic means comprises an OR gate circuit to which said difference signal of each said comparator is connected, said OR gate circuit having an output whose polarity alternation frequency is double the frequency of said sinusoidal input signal to provide said first multiple frequency output signal.

* * * * *